(12) United States Patent
West et al.

(10) Patent No.: US 7,779,007 B2
(45) Date of Patent: Aug. 17, 2010

(54) IDENTIFYING CONTENT OF INTEREST

(75) Inventors: Wayne J. West, Henderson, NV (US); Arthur R. Crivella, Pittsburgh, PA (US); Clayton Darwin, Thomaston, GA (US)

(73) Assignee: ASE Edge, Inc., Carnegie, PA (US)

( * ) Notice: Subject to any disclaimer, the term of this patent is extended or adjusted under 35 U.S.C. 154(b) by 382 days.

(21) Appl. No.: 11/760,485

(22) Filed: Jun. 8, 2007

(65) Prior Publication Data
US 2007/0294784 A1    Dec. 20, 2007

Related U.S. Application Data

(60) Provisional application No. 60/811,822, filed on Jun. 8, 2006.

(51) Int. Cl.
G06F 17/30    (2006.01)

(52) U.S. Cl. ...................................... 707/736

(58) Field of Classification Search ........................ None
See application file for complete search history.

(56) References Cited

U.S. PATENT DOCUMENTS

| | | | |
|---|---|---|---|
| 5,301,109 A | | 4/1994 | Landaver et al. |
| 5,757,983 A | | 5/1998 | Kawaguchi et al. |
| 6,023,670 A | * | 2/2000 | Martino et al. ............... 704/8 |
| 6,189,002 B1 | | 2/2001 | Roitblat |
| 6,493,711 B1 | | 12/2002 | Jeffrey |
| 6,628,312 B1 | | 9/2003 | Rao et al. |
| 6,668,256 B1 | | 12/2003 | Lynch |
| 6,708,165 B2 | | 3/2004 | Jeffrey |
| 6,728,707 B1 | | 4/2004 | Wakefield |
| 6,751,628 B2 | | 6/2004 | Coady |
| 6,778,995 B1 | | 8/2004 | Gallivan |
| 6,888,548 B1 | | 5/2005 | Gallivan |
| 6,892,189 B2 | | 5/2005 | Quass et al. |
| 2002/0078035 A1 | * | 6/2002 | Frank et al. ............... 707/3 |
| 2003/0028520 A1 | | 2/2003 | Alpha |
| 2005/0289106 A1 | * | 12/2005 | Petri et al. ............... 707/1 |

OTHER PUBLICATIONS

Hu, Cheng. "Text Statistics Tool Box for Natural Language Processing." 2003. Web. Oct. 21, 2009. <http://www.ai.uga.edu/mc/pronto/Hu.pdf>.*

U.S. Appl. No. 60/354,403, filed Feb. 4, 2002, E. Charnock.

Baroni, M. et al., "BootCaT: Bootstrapping Corpora and Terms from the Web", Language Resourcers and Evaluation Conference (LREC), 2004, pp. 1314-1316, XP002476815. Retrieved from the Internet: URL:http://sslmit.unibo.it/{baroni/publications/lrec2004/bootcat_lrec_2004.pdf> [retrieved on Apr. 13, 2008] p. 1313, col. 1, line 1-p. 1315, col. 1, line 27.

(Continued)

*Primary Examiner*—Mohammad Ali
*Assistant Examiner*—Syed H Hasan
(74) *Attorney, Agent, or Firm*—K&L Gates LLP

(57) ABSTRACT

Methods of identifying content of interest within a corpus are disclosed. The methods may comprise the step of applying a first marker set to the corpus, where the first marker set comprises at least one marker identifying a first type of text. For a first textual unit included in the corpus, the methods may comprise generating a score for the first marker set and comparing the score to a reference score. The score may indicate a number of instances of the at least one marker in the first textual unit.

32 Claims, 16 Drawing Sheets

OTHER PUBLICATIONS

Kongkachandra, R. et al.: "Newly-Born Keyword Extraction under Limited Knowledge Resources based on Sentence Similarity Verification", International Symposium on Communications and Information Technologies (ISCIT), 2004, pp. 1183-1187, Sapporo, Japan, XP002476816. Retrieved from the Internet: URL:http://ieeexplore.ieee.org/iel5/9699/30638/01413905.pdf?arnumber=1413905> [retrieved on Apr. 12, 2008] the whole document.

Salton, G. et al.: "Term-Weighting Approaches in Automatic Text Retrieval", Information Processing & Management, vol. 24, No. 5, 1988, pp. 513-523, XP000716208.

Baroni, M. et al., "WebBootCaT: instant domain-specific corpora to support human translators", Proceedings of EAMT 2006—11th Annual Conference of the European Association for Machine Translation, Jun. 20, 2006, pp. 247-252, XP002476817. Retrieved from the Internet: URL:http://trac.sketchengine.co.uk/attachment/wiki/WBC/Docsindex/webbootcat_eamt06.pdf?format=raw> [retrieved on Apr. 12, 2008] the whole document.

ISR and Written Opinion, PCT/US2007/70770, Jun. 8, 2007.

* cited by examiner

FIG. 3A

| | ITEM | ITEM_TYPE | FREQ_% | FREQ_VALID | FREQ_RARITY | FILES_Z | FILES_VALID | FILES_RARITY | STAT_SAL |
|---|---|---|---|---|---|---|---|---|---|
| 1 | ADVICE | TOKEN | 5.309 | 1 | 0.984 | 4.154 | 1 | 0.88 | 4.409 |
| 2 | NEED /3 ADVICE | COLLOCATE | 3.68 | 1 | 0.999 | 2.228 | 0 | 0.995 | 2.945 |
| 3 | REPLY /3 ADVICE | COLLOCATE | 3.394 | 1 | 1 | 2.23 | 0 | 1 | 2.812 |
| 4 | NEED ADVICE | BIGRAM | 3.169 | 1 | 0.999 | 1.973 | 0 | 0.998 | 2.568 |
| 5 | ANY /3 ADVICE | COLLOCATE | 3.029 | 1 | 0.997 | 2.009 | 0 | 0.988 | 2.5 |
| 6 | ANY ADVICE | BIGRAM | 3.005 | 1 | 0.999 | 1.992 | 0 | 0.995 | 2.491 |

Decompressing "E:\ZZZ-DATA-REPOSITORY\RV-FORUM-PILOT\web-forum.sql.bz2" to "E:\ZZZ-DATA-REPOSITORY\RV-FORUM-PILOT\web-forum.level1"
Finished decompressing
opening "e:\zzz-data-repository\rv-forum-pilot\web-forum.level1"
showing only significant items: False
showing only valid items: False
ordering items by (v\stat_sal, ASC)
ordering items by (v\stat_sal, 'DESC')
ordering items by (v\files_rarity, 'ASC')
ordering items by (v\files_rarity, 'DESC')
ordering items by (v\freq_rarity, 'ASC')
ordering items by (v\freq_rarity, 'DESC')
ordering items by (v\stat_sal, 'ASC')
ordering items by (v\stat_sal, 'DESC')

ASE Level 1 Viewer
File View Help
Statistics | Tokens | Items
Filter: advice   ☐ Whole Words Only   Page 1

| # | TOKEN | FREQ | FREQ_PER | FILES | FILES_PER |
|---|---|---|---|---|---|
| 1 | ADVICE | 1681 | 0.011 | 1349 | 4.767 |
| 2 | ADVICED | 1 | 0 | 1 | 0.004 |
| 3 | ADVICES | 2 | 0 | 2 | 0.007 |
| 4 | HEARTSMARTADVICE | 30 | 0 | 24 | 0.085 |
| 5 | MOTORHOMEADVICE | 1 | 0 | 1 | 0.004 |
| 6 | RVADVICE | 1 | 0 | 1 | 0.004 |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |
| 24 | | | | | |
| 25 | | | | | |
| 26 | | | | | |
| 27 | | | | | |
| 28 | | | | | |
| 29 | | | | | |
| 30 | | | | | |
| 31 | | | | | |
| 32 | | | | | |
| 33 | | | | | |
| 34 | | | | | |
| 35 | | | | | |
| 36 | | | | | |

320 — FREQ
322 — FREQ_PER
324 — FILES
326 — FILES_PER

Decompressing "E:\ZZZ-DATA-REPOSITORY\RV-FORUM-PILOT\web-forum.sql.bz2" to "E:\ZZZ-DATA-REPOSITORY\RV-FORUM-PILOT\web-forum.level1"
Finished decompressing
opening "e:\zzz-data-repository\rv-forum-pilot\web-forum.level1"

FIG. 3B

KWIC: FILE - ORDER SORT - Microsoft Internet Explorer

File  Edit  View  Favorites  Tools  Help

Marker Sets: [0]         Process WEB Forum

KWIC Display: FILE-ORDER Sort
Total Marker Instances: 109
Instances Examinied: 109
Instances Skipped: 0
Unique Instances Displayed: 69

Click the marker instance for more information. This will open a new window displaying data for the chunk that contains the marker instance. Then the X the widow to continue here. If the instance count number is red, this indicates the marker displayed has a negative weight.   ⟵402  ⟵404   ⟵406

| # | | | |
|---|---|---|---|
| 1 | sounds like a good and easy | fix | if you're going to travel why |
| 2 | tenance insurance storgage warranty | repairs | etc. a lot of people have |
| 3 | ehicle required some sort of minor | repair | done by us before we could |
| 4 | of about the same vintage the | fixed | end of the cord goes into |
| 5 | different from a condo at a | fixed | location with maintenance crews cleanin |
| 6 | camera and take pictures as you | repair | manuals for these older units can |
| 7 | before you start a project finding | repair | replace I need to do that |
| 8 | r warranty now that everything is | fixed | we love the motor home and |
| 9 | eal the seams fleetwood refused to | repair | the leaks said leaks due to |
| 10 | blew all of these items were | repaired | under warranty with no problems the |
| 11 | in front windshield 3 attempts to | fix | this lock on water door broke |
| 12 | back to dealer for 12 items | repaired | or replaced items with no problems |
| 13 | shear convenience of being able to | fix | something to eat or go to |
| 14 | niceer I could have had it | fixed | here in major bring it |
| 15 | a portion of the cost to | fix | it but are offering to pay |
| 16 | urse fleetwood is saying ehy wont | repair | the salesman is unsure but suspects |
| 17 | this just a model thing collision | repair | place or have them come to |
| 18 | ill take my rig to a | fix | it I find someone else to |
| 19 | or duct tape if that cant | fix | guy to come look at the |
| 20 | ok I hired a mobil rv | repaired | as you said whoever pays for |
| 21 | work I know it will be | repair | without delay whoever pays but then |
| 22 | trust it can and will be | fixed | and then get back on the |
| 23 | it may be or get it | fix | whatever it may be or |
| 24 | to do about it they go | repair | the leak it probably just needs |
| 25 | you would have to pay to | repair | it probably still under warranty now |
| 26 | v dealer should be responsible for | fix | everything that was damaged even the |
| 27 | this do you think they will | repair | shop anyone else experience this do |
| 28 | bring it home and to the | repair | everything that was caused by the |
| 29 | would imagine they would have to | fix | the roof but nothing else I |
| 30 | thinking they will say yeah well | | |

*FIG. 4A*

TOP 100 LEFT-SIDE COLLOCATES (frequency sort)

| RANK | COLL /1 NODE | | COLL /3 NODE | | COLL /10 NODE | | COLL /30 NODE | |
|---|---|---|---|---|---|---|---|---|
| 001 | of | 378 | of | 700 | the | 1410 | the | 3783 |
| 002 | the | 262 | the | 531 | of | 1329 | of | 2989 |
| 003 | his | 88 | and | 179 | and | 612 | and | 1913 |
| 004 | god's | 80 | by | 133 | in | 419 | to | 1359 |
| 005 | divine | 76 | his | 119 | to | 408 | in | 1256 |
| 006 | and | 68 | a | 115 | that | 331 | that | 919 |
| 007 | thy | 60 | that | 110 | a | 303 | is | 881 |
| 008 | that | 47 | in | 104 | is | 268 | a | 866 |
| 009 | in | 44 | god's | 93 | by | 262 | it | 802 |
| 010 | a | 38 | to | 85 | his | 235 | not | 626 |
| 011 | baptismal | 31 | divine | 77 | it | 214 | as | 618 |
| 012 | by | 23 | thy | 70 | as | 187 | by | 518 |
| 013 | this | 17 | with | 58 | not | 180 | his | 504 |
| 014 | supernatural | 17 | is | 44 | with | 151 | he | 451 |
| 015 | is | 15 | or | 41 | be | 134 | be | 417 |
| 016 | all | 15 | for | 41 | we | 130 | for | 415 |
| 017 | with | 14 | nature | 40 | for | 130 | but | 413 |
| 018 | or | 14 | all | 39 | he | 127 | with | 406 |
| 019 | free | 14 | through | 38 | but | 126 | which | 391 |
| 020 | from | 12 | but | 36 | us | 123 | are | 391 |
| 021 | spiritual | 10 | god | 34 | are | 123 | we | 386 |
| 022 | our | 10 | this | 33 | or | 118 | i | 372 |

FIG. 4B

LSE Level 3 Viewer

File  Edit  View  Favorites  Rate  Reports  Help

Sample Gloss Data Set: "Repairs" v1 6/8/2006

Gloss Information list view recent posts notify me of new posts posted: 8/23/2004 10:25 am reply|quote|edit|print|notify moderator sounds like air is leaking through the gasket. take a dollar bill and hold it near the edge of the door, close the door and check on the tension of the bill when you pull it through. go all around the door if it slips through easily in a certain spot your door could need adjusting peaceful patton "in his grip" a true friend is someone who reaches for your hand, and touches your heart. "full-timing view profile send private message add to my buddy list view recent posts notify me of new posts posted: 823/2004 11:39am reply|quote| edit|print|notify moderator either air is leaking past the door or the unit isn't cooling properly. if the gasket is tight, put a thermometer inside the freezer. if it isn't well below 32°, start looking for a repair shop. find a shop that will check the simple things before they start selling you new circuit boards or a new cooling unit. ken display posts: oldest posts first newest posts first viewing 1-3 of 3 new topic|reply to topic|subscribe Gloss #1
Gloss occurs 1 times Review Progress
Gloss 0 of 1580
0.0% Reviewed

702

Marker Set Channels for Gloss #1

703

Marker Set "rv-parts"
Z-Score: 5.03

704 — Rate
○ Strongly Disagree  ○ Disagree  ○ Neutral  ○ Agree  ○ Strongly Agree  ○ Cannot Determine Comments ⇦ Review as Last   ⇦ Previous   🔍 Show Me   🔍 Find   ⇧ Next   💾 Save   Quit

*FIG. 7*

ASE Level 1 Viewer
File  View  Help
Statistics | Tokens | Items
Domain [all ▼]   Page [1]   ← 1002   ← 1004

| | Item | value |
|---|---|---|
| 1 | 1-gram tokens | 3279690 |
| 2 | 1-gram ttr | 18.391 |
| 3 | 1-gram types | 178336 |
| 4 | check:non-standard:french | 0 |
| 5 | check:non-standard:german | 0 |
| 6 | check:non-standard:italian | 0 |
| 7 | check:non-standard:latin | 0 |
| 8 | check:non-standard:portuguese | 0 |
| 9 | check:non-standard:russian | 0 |
| 10 | check:non-standard:spanish | 0 |
| 11 | check:non-standard:spreadsheet | 6 |
| 12 | check:non-standard:unknown | 35 |
| 13 | check:non-standard:web_coding | 0 |
| 14 | check:odd-counts:empty | 0 |
| 15 | check:odd-counts:mega | 0 |
| 16 | check:odd-counts:short | 12 |
| 17 | directories:total | 1 |
| 18 | estimate:std-1-calls | 3279806 |
| 19 | estimate:std-2-calls | 6557416 |
| 20 | estimate:std-2-grams | 3279806 |
| 21 | estimate:std-3-calls | 9832830 |
| 22 | estimate:std-3-grams | 3277610 |
| 23 | estimate:std-4-grams | 3275414 |
| 24 | estimate:total-1-calls | 3281208 |
| 25 | estimate:total-2-calls | 6560168 |
| 26 | estimate:total-2-grams | 3281208 |
| 27 | estimate:total-3-calls | 9836880 |
| 28 | estimate:total-3-grams | 3278960 |
| 29 | estimate:total-4-grams | 3276712 |
| 30 | files-ratio:per-directory | 2248 |
| 31 | files:1-10megs | 0 |
| 32 | files:1-9 tokens | 12 |
| 33 | files:10-99 tokens | 237 |
| 34 | files:100-999 tokens | 1791 |
| 35 | files:1000-9999 tokens | 174 |
| 36 | files:10000-99999 tokens | 32 |

Opening "e:\aaa-ah-berstein\level1-datasets\existing-issuecodes\leases.level1"

FIG. 10A

ASE Level 1 Viewer

File  View  Help

Statistics | Tokens | Items |

Domain [all ▼]   Page [1]   ⌐1002   ⌐1004

| | item | value |
|---|---|---|
| 35 | files:1000-9999 tokens | 174 |
| 36 | files:10000-99999 tokens | 32 |
| 37 | files:100000-999999 tokens | 2 |
| 38 | files:10megs-plus | 0 |
| 39 | files:empty | 0 |
| 40 | files:non-std-text | 52 |
| 41 | files:spreadsheet | 52 |
| 42 | files:std-text | 2196 |
| 43 | files:total | 2248 |
| 44 | listing | c:\zz-ise-eh\iss |
| 45 | numbers-ratio:per-file | 370 |
| 46 | numbers-ratio:per-non-file | 10 |
| 47 | numbers-ratio:per-std-file | 379 |
| 48 | numbers:non-std-text | 535 |
| 49 | numbers:std-text | 832922 |
| 50 | numbers:total | 833457 |
| 51 | nurds-ratio:per-file | 22 |
| 52 | nurds-ration:per-non-file | 2 |
| 53 | nurds-ratio:per-std-file | 23 |
| 54 | nurds:non-std-text | 108 |
| 55 | nurds:std-text | 51298 |
| 56 | nurds:total | 51406 |
| 57 | tokens-ratio:per-file | 1460 |
| 58 | tokens-ratio:per-non-file | 27 |
| 59 | tokens-ratio:per-std-file | 1494 |
| 60 | tokens:non-std-text | 1454 |
| 61 | tokens:std-text | 3282002 |
| 62 | tokens:total | 3283456 |
| 63 | words-ratio:per-file | 1066 |
| 64 | words-ratio:per-non-file | 15 |
| 65 | words-ratio:per-std-file | 1091 |
| 66 | words:non-std-text | 811 |
| 67 | words:std-text | 2397782 |
| 68 | words:total | 2398593 |
| 69 | | |
| 70 | | |
| 71 | | |

Opening "e:\aaa-ah-berstein\level1-datasets\existing-Issuecodes\leases.level1"

IDENTIFYING CONTENT OF INTEREST

CROSS-REFERENCE TO RELATED APPLICATION

This application claims the benefit of U.S. Provisional Application Ser. No. 60/811,822 field on Jun. 8, 2006, which is incorporated herein by reference.

BACKGROUND

As more and more information becomes available in electronic format, the task of locating content useful for any one purpose is becoming increasingly challenging. Traditional methods of locating content involve simple text search engines. Given one or more text strings as input, search engines access a body of electronic information and identify text that includes instances of the input string or strings. It can be appreciated, however, that search engines are only as good at their input text strings. By a process of trial-and-error, skilled users are sometimes able to construct input text strings that generate acceptable results. Even these results, however, often require a great deal of careful reading on the part of the user to identify desired content. Also, the process of developing the input text strings is often iterative, and time consuming. Results are highly dependent on the skill of the user, including the user's direct knowledge of the language associated with the desired content.

SUMMARY

In one general aspect, the various embodiments are directed to methods of generating a marker set comprising markers that identify a desired type of text. The methods may comprise the steps of selecting a seed marker set comprising at least one seed marker and generating a seed corpus from a first reference corpus. The seed corpus may comprise a plurality of textual units, and each textual unit of the seed corpus may comprise at least one instance of a seed marker included in the seed marker set. The methods may also comprise the steps of generating a statistical value describing the seed marker set and the seed corpus, and generating a revised seed marker set.

In another general aspect, the various embodiments are directed to methods of identifying content of interest within a corpus. The methods may comprise the step of applying a first marker set to the corpus, where the first marker set comprises at least one marker identifying a first type of text. For a first textual unit included in the corpus, the methods may comprise generating a score for the first marker set and comparing the score to a reference score. The score may indicate a number of instances of the at least one marker in the first textual unit.

In yet another general aspect, the various embodiments are directed to methods of evaluating textual content. The methods may comprise the steps of identifying instances of a marker in a corpus and identifying instances of a second marker set in the corpus. For an instance of the second marker set that occurs within a predetermined range of an instance of the marker, the methods may involve displaying tokens comprising the instance of the second marker set, tokens comprising the instance of the marker and one or more intervening tokens.

BRIEF DESCRIPTION OF THE FIGURES

Embodiments of the present invention are described herein, by way of example, in conjunction with the following figures, wherein:

FIGS. 3A, 3B, 4A and 4B show user interfaces that may be shown to a user according to various embodiments;

FIGS. 6 and 7 show user interfaces that may be shown to a user according to various embodiments;

FIGS. 10A and 10B show user interfaces that may be shown to a user according to various embodiments;

FIGS. 12A and 12B show user interfaces that may be shown to a user according to various embodiments.

DETAILED DESCRIPTION OF THE INVENTION

Figure 1:
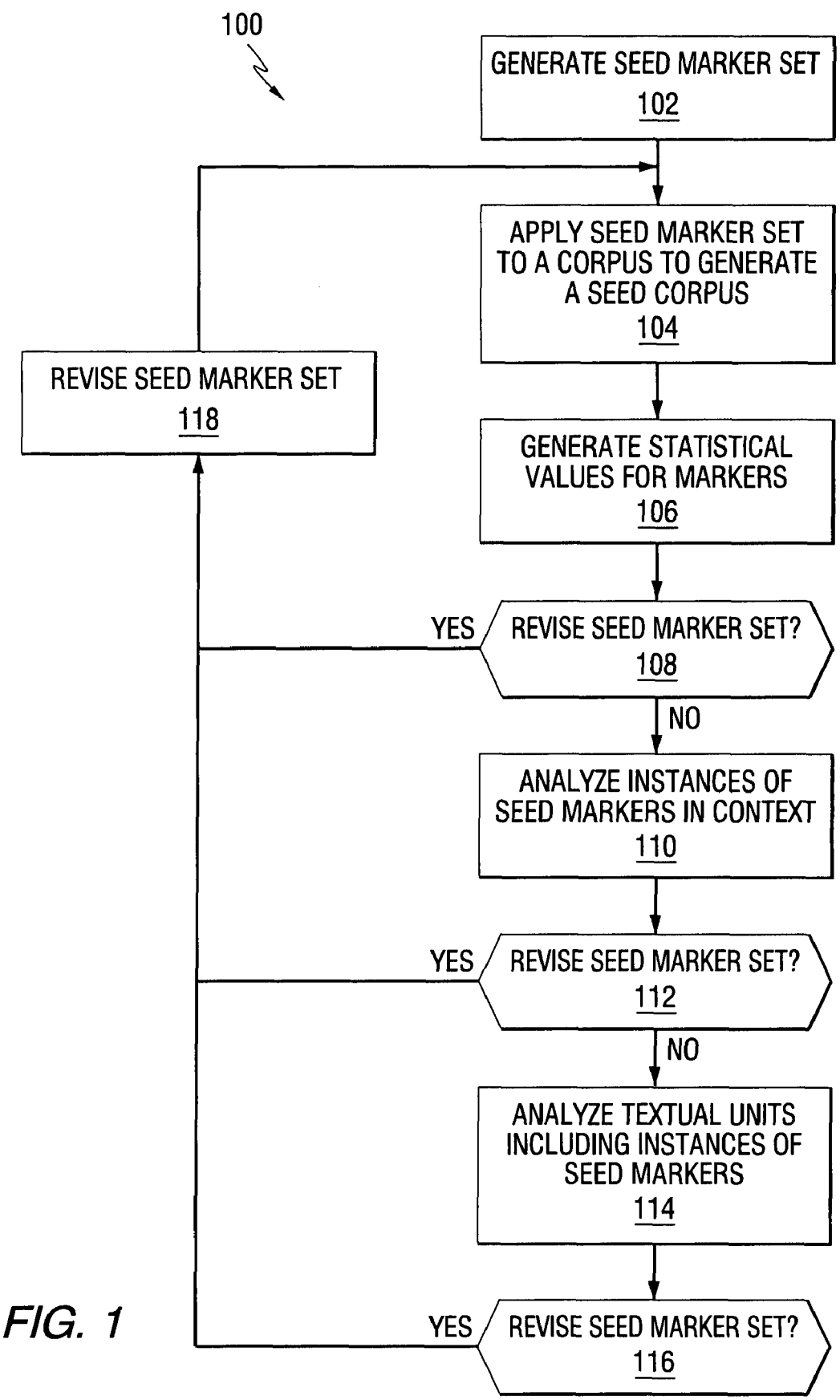
FIG. 1 shows a flow chart illustrating a process flow for generating a marker set according to various embodiments.

Various embodiments of the present disclosure are directed to methods and systems for identifying content of interest within a test corpus. Content of interest may be any suitable classification of information, discourse, etc. For example, in the context of a litigation support tool, the test corpus may include information that may be subject to discovery. In that case, content of interest may include documents and/or communications within the test corpus that are responsive, privileged, etc. In the context of a search of the World Wide Web, content of interest may be a particular web page or type of web page. For example, if an individual is searching for customer reviews of a particular product, content of interest may include web forums dedicated to the product. Other contexts (e.g., risk management, contract comparison, insurance policy review, etc.) may lead to other content of interest. It will be appreciated that content of interest may be defined broadly (e.g., bankruptcy analysis) or narrowly (e.g., Food and Drug Administration (FDA) communications during a particular time period regarding a particular drug).

Various embodiments may apply one or more markers or marker sets to the test corpus to identify content of interest. Each marker set may identify text of a given type. Textual units within the test corpus may be assigned a score for each of the marker sets. Each score may indicate a degree to which the textual unit includes text of the type identified by the marker set (e.g., a number, or weighted number of occurrences in the textual unit of markers included in the marker set). A set of evaluative rules may then be applied to the textual units, based at least in part on the scores, to determine which are likely to include textual units include content of interest, or a likelihood that any given textual unit includes content of interest. The evaluative rules may consider any suitable indicators of textual unit content, including, for example, scores for at least one marker set.

Marker sets, according to various embodiments, may include one or more markers, or combinations of markers that identify text of any particular type. For example, different marker sets may include markers identifying text that conveys an event, a category of world knowledge, a particular discourse structure, an emotion, a notion, a process, a temporal concept, a type of language (e.g. personal discussions), word types (e.g., personal pronouns), etc. For example, Table 1 below shows a marker set including markers that identify text conveying an event, (e.g., "travel"):

TABLE 1

Travel Marker Set book airfare
air travel
scheduled departure
boarding pass
one way fares
electronic ticket
confirmation number
non refundable fare
frequent flyer program
flights need to be booked
arrival date
arrival dates
departure w/2 date
departure dates
arrival and departure dates
scheduled departure time
before scheduled departure Other examples of specific text types that a marker set may identify include, world currency, narrative conjunctions, anger nouns, doubt, risk terminology, future verbs, formal language, urgency idioms, possessive singular pronouns, etc.

Figure 2:
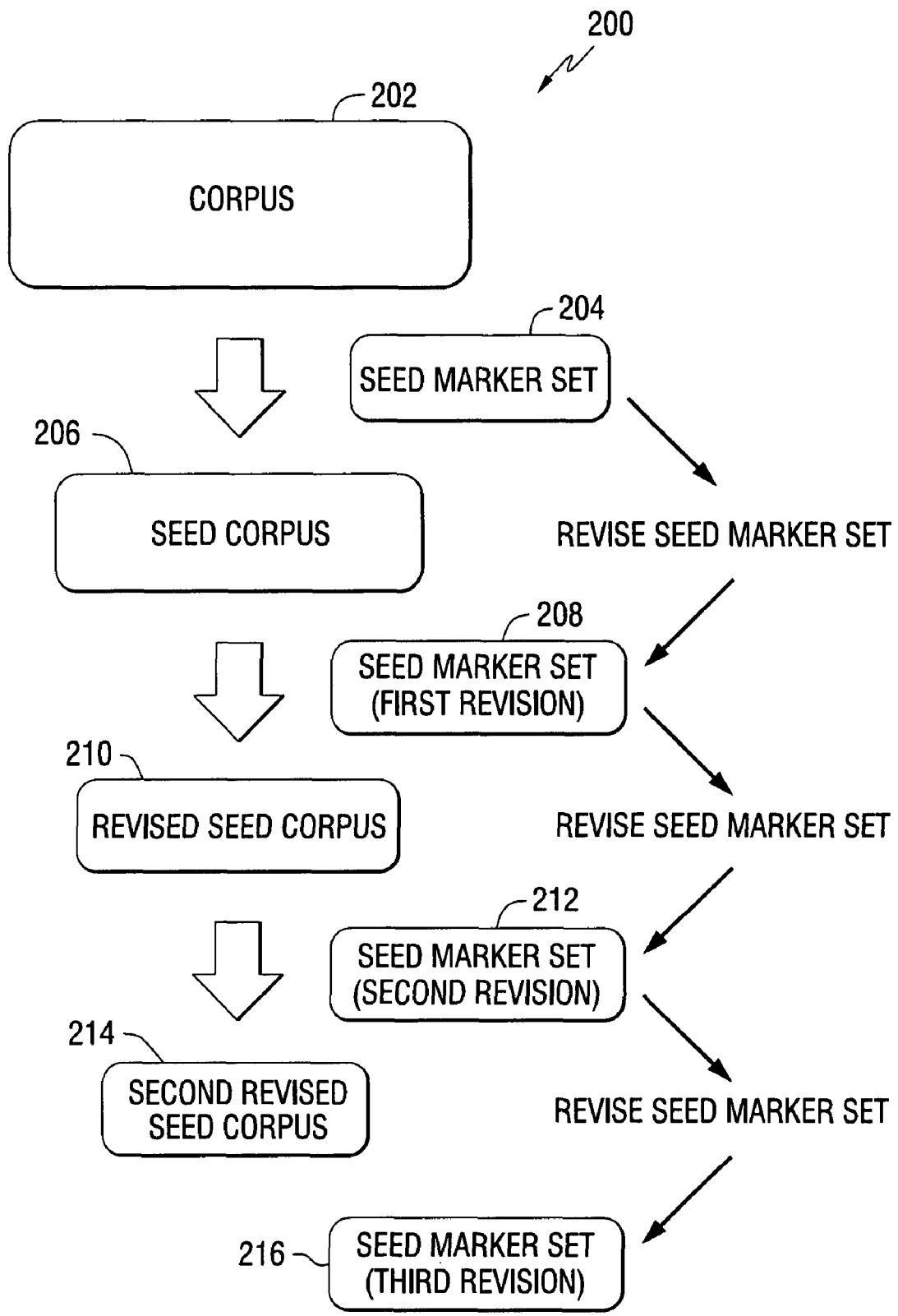
FIG. 2 shows a block diagram of a workflow for generating a marker set according to various embodiments.

FIGS. 1 and 2 show a process flow 100 and block diagram 200, according to various embodiments, for generating a marker set that identifies text of a particular type. Referring to FIG. 1, at step 102, a seed marker set 204 may be generated. The seed marker set 204 may include a seed marker, or combination of seed markers, that are believed to connote text of a particular type. The seed marker or markers may be selected based on various criteria including, for example, previous statistical analysis of corpora, experience of the user, etc. In various embodiments, it may be desirable to craft a seed marker set that is over-inclusive (e.g., a marker set that describes more than just the desired text).

At step 104, the seed marker set 204 may be applied to a reference corpus 202 to generate a seed corpus 206. The seed corpus 206 may include all of the textual units of the reference corpus 202 that have at least one instance of a seed marker included in the seed marker set 204. The reference corpus may be any suitable corpus. For example, in various embodiments, the reference corpus may be a general reference corpus including information and/or discourse in a wide variety of categories. In other various embodiments, the reference corpus may be chosen relative to the particular type of text to be identified by the marker set. For example, if the particular type of text is text related to a contract, it may be advantageous to select a reference corpus that includes various legal documents.

After the seed corpus 206 has been generated, it may be analyzed to verify that the seed marker set does, in fact, return text of the desired type. For example, at step 106, statistical values for the seed markers in the seed corpus 206 may be calculated. Any statistical value describing a seed marker may be used including, for example, frequency, z-score, rarity, saliency, etc. Methods for calculating various statistical values, including those listed above, are described in more detail below. For statistical values that require comparison to a reference corpus (e.g., z-score, saliency, etc.), any suitable reference corpus or corpora may be used including, for example, the reference corpus 202.

The statistical values for each seed marker calculated at step 106 may be presented to the user according to any suitable method or interface. For example, FIGS. 3A and 3B show an exemplary user interface 300, according to various embodiments. Although the interface 300 is described in the context of presenting statistical values describing seed markers in a seed corpus, it will be appreciated that the interface 300 may be used for presenting any statistical values describing markers in any corpus.

Referring to FIG. 3A, the interface 300 is shown to include a series of rows and columns. Each row may correspond to one seed marker. Column 302 lists the seed markers corresponding to each row. Column 304 lists the type of each seed marker (e.g., n-gram, token, collocate, etc.). Column 306 lists the frequency z-score for each seed marker, or z-score based the total occurrences of the seed marker in the seed corpus. Column 308 lists a validity of the frequency z-score. The validity may be an indication of whether the corresponding seed marker appears in the seed corpus often enough for the frequency z-score to be statistically significant. Column 310 shows the frequency rarity of the seed marker. Column 312 shows the file z-score of the seed marker, or the z-score based on the number of files in the seed corpus that include the respective seed marker. Column 314 indicates a validity of the file z-score. Column 316 shows a file rarity for each seed marker. Column 318 shows a statistical saliency for each seed marker. As shown in FIG. 3B, raw values for various seed markers may also be shown. For example, column 320 shows a frequency per corpus for the seed markers. Column 322 shows a frequency per textual unit. Column 324 shows a number of textual units including an instance of the marker, and column 326 shows a number of textual units per corpus that include the marker. It will be appreciated that the values shown at columns 320, 322, 324 and 326 may be raw or scaled values.

Referring back to FIG. 1, after the statistical values are generated at step 106, it may be determined at step 108 whether to revise the seed marker set based only on the statistical values. It will be appreciated that analyzing the statistical values may give an indication of whether the seed markers included in the seed marker set indicate the intended text type. For example, if a particular seed marker has a very high frequency, low z-score, etc., it may be a sign that the seed marker is too common to indicate the intended text type. Accordingly, the seed marker set may be revised after the statistical values are calculated and analyzed.

At step 110, the seed markers may be analyzed in context. For example, one or more instances of the seed marker may be shown along with a series of tokens appearing immediately before or after the seed marker. FIG. 4A shows a user interface 400, according to various embodiments, for reviewing instances of markers in context. Instances of seed markers may be listed at column 404; the tokens appearing in the seed corpus immediately before the instances may be listed at column 402; and the tokens appearing in the seed corpus immediately after the instances may be listed at column 406. For example, to implement steps 110 and/or 114, one or more known marker sets may be applied to the tokens near an instance of a seed marker or in the same textual unit.

In addition, according to various embodiments, tokens forming collocates with the seed marker may also be found and displayed. For example, FIG. 4B shows a user interface 450 illustrating a list of tokens forming collocates with an exemplary seed marker in an exemplary corpus. Column 452 shows all of the tokens forming collocates within one token of an instance of the seed marker. Column 454 shows all of the tokens forming collocates within three tokens of the seed marker; column 456 shows tokens forming collocates within ten tokens of the seed marker and column 458 shows tokens forming collocates within 30 tokens of the seed marker. In each of the columns 452, 454, 456, 458, the tokens may be listed in order of frequency. The user interface 450 may allow text type surrounding the instances of seed markers (e.g., the context) to be found and analyzed. It will be appreciated that analyzing the instances of seed markers in context may provide information regarding whether a particular seed marker indicates the intended text type. Accordingly, it may be determined whether to revise the seed marker set at step 112 based on the review or analysis of context at step 110, and/or of the statistical values generated at step 106.

At step 114, textual units including instances of the seed markers may be analyzed. This may provide an indication of whether the seed marker set 304 returns textual units including the intended text type. At step 116, it may be determined whether to revise the seed marker set based on either the statistical values generated at step 106, the review in context at step 110 and/or the review of textual units at step 114. Revising the seed marker set may include, for example, removing one or more markers, adding one or more markers, changing the weight of markers, etc.

It will be appreciated that, in various embodiments, the analysis of the seed marker set in the seed corpus may be partially or completely automated. For example, rule sets may be developed that automatically evaluate markers and/or instances of markers based on whether, or to what extent the seed markers include the desired text type. In various embodiments, the rule sets may include one or more rules based on statistical values. For example, seed markers and/or textual units in the seed corpus may be ranked according to frequency, z-score, etc. Also, the rule sets may include one or more rules based on contextual analysis of seed marker instances.

If, based on the above-described analysis, it is determined that the seed marker set does acceptably identify the desired text type, then it may be considered acceptable for use. On the other hand, if at any of decision steps 108, 112 and 116, it is determined that the seed marker set should be revised, that revision may occur at step 118. It will be appreciated that the seed marker set may be revised in various ways. For example, existing seed markers may be removed and/or new seed markers may be added. Also, in various embodiments, seed marker weights may be manipulated. Each marker in a marker set may be assigned a weight. When the marker set is applied to a corpus, each instance of a marker may be scaled by a value proportional to its weight. This scaled value may be used in generating a score for the marker set, as described in more detail below. Marker weights may be useful, for example, if two markers appear in the seed corpus at approximately the same frequency, but one of the two is a stronger indicator of the desired text type. In this case, the marker that is a stronger indicator may be given a proportionally higher weight.

After the seed marker set has been revised, if it is revised, one of at least two possibilities may occur. First, the revised seed marker set may be considered acceptable for use. Otherwise, the revised seed marker set may be subject to additional analysis and/or refinement. Referring to FIG. 2, in various embodiments, the revised seed marker set 208 may be applied to the seed corpus 206 to generate a revised seed corpus 210. The revised seed corpus 210 may then be analyzed with respect to the revised seed marker set 208. If desired, a second revised marker set 212 and second revised seed corpus 214 may be generated. This process may occur as many times as necessary to develop a marker set that acceptably identifies the desired text type. In various embodiments, after revision, a seed marker set may be applied to a second reference corpus (not shown in FIG. 2). The process of FIGS. 1 and 2 may then be repeated with respect to the second reference corpus.

Figure 5:
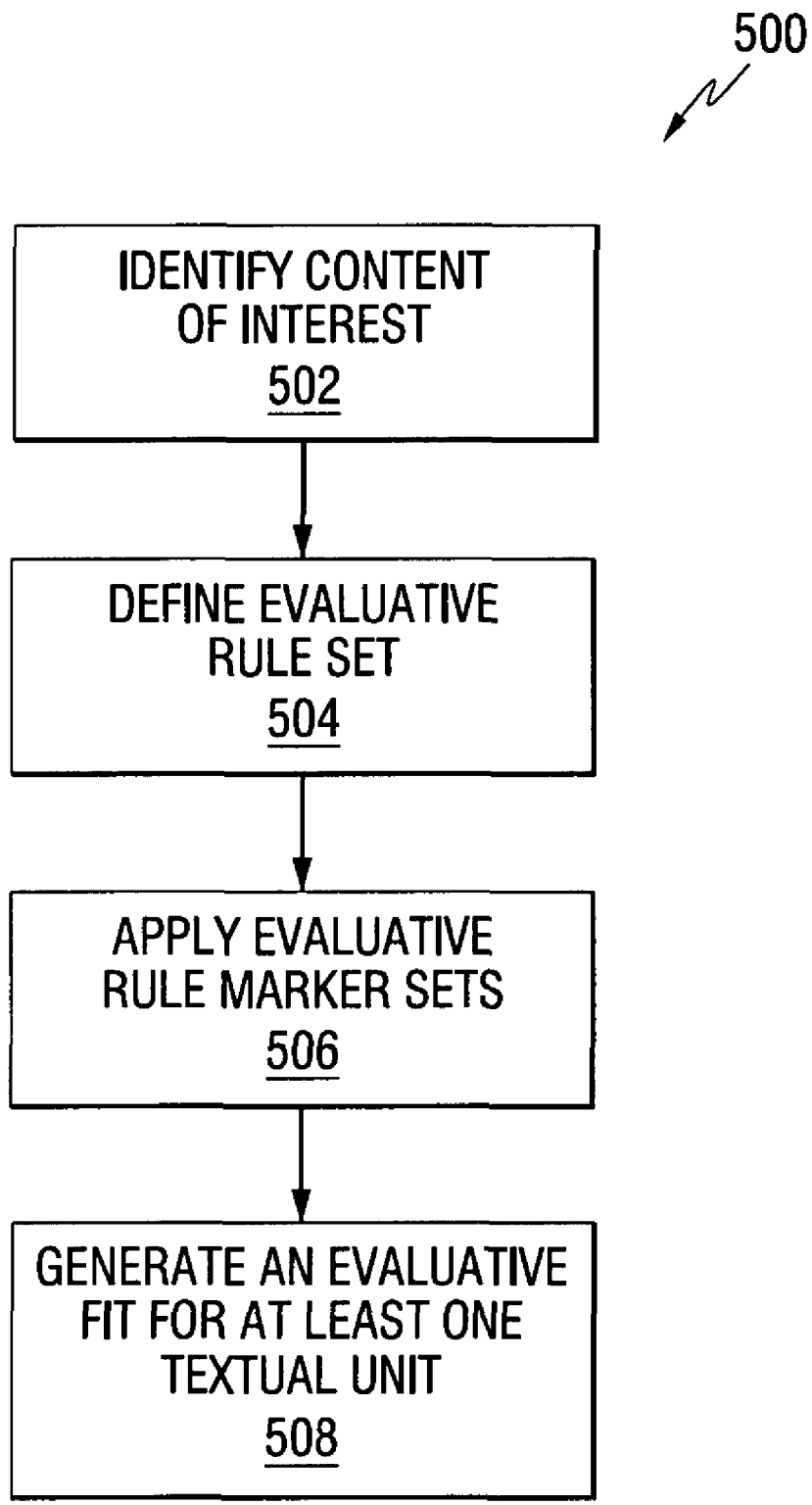
FIG. 5 shows a flow chart illustrating a process flow for identifying content of interest using one or more marker sets according to various embodiments.

When one or more marker sets that identify text of a particular text type are generated, they may be applied to a test corpus to identify content of interest in the test corpus. FIG. 5 shows a flow chart illustrating a process flow 500, according to various embodiments, for identifying content of interest. At step 502, content of interest may be identified. Content of interest may be determined based on the particular embodiment, for example, as described above. At step 504, a set of evaluative rules may be developed to describe the content of interest.

The evaluative rules may be of various types. For example, evaluative rules may be binary and/or quantitative. Binary rules may define a threshold criterion that candidate textual units either meet or fail to meet (e.g., certain metadata criteria, particular scores for a given marker or marker set, etc.). Binary rules may be expressed inclusively or exclusively. For example, under an inclusive expression, candidate textual units that meet a threshold may be considered likely to include content of interest. Under an exclusive expression, candidate textual units that meet a threshold may be eliminated from further consideration. Quantitative rules may rate the likelihood that a given textual unit contains content of interest based on a predefined criterion or set of criteria. For example, a textual unit having a score or range of scores for a given marker set or sets may be considered to have a predetermined likelihood of including content of interest.

The evaluative rule set may include one or more rules that consider the results of applying a marker set identifying text of a particular type to the test corpus. For example, the application of a marker set to the test corpus may yield a raw score that indicates the number of occurrences of markers in the marker set in the corpus, and/or in each textual unit of the corpus. It will be appreciated that if any markers in the marker set are weighted, the raw score may be weighted accordingly. The raw score itself may be a criterion of one or more of the evaluative rules (e.g., if the raw score for Marker Set A is less than X, then eliminate it from consideration). Also, various values derived from the raw scores of one or more marker sets may make up evaluative rule criteria. Exemplary derivative values include, a z-score for the marker set based on its application to a reference corpus, a rarity of the marker set, a saliency of the marker set, etc.

In various embodiments, an offset, or average offset between instances of one or more marker sets may also be a criterion of an evaluative rule. Exemplary offset values include the distance in tokens between an instance of a first marker set and an instance of a second marker set, the distance in textual units between a textual unit including the first marker set and a textual unit including the second marker set, averages of offset values over all instances of the marker sets, etc. It will be appreciated that offset values may also be calculated to represent the distance between instances of a single marker set. It is envisioned that any suitable permutation of applying one or more marker sets to the test corpus may be a criterion of an evaluative rule.

Figure 6:
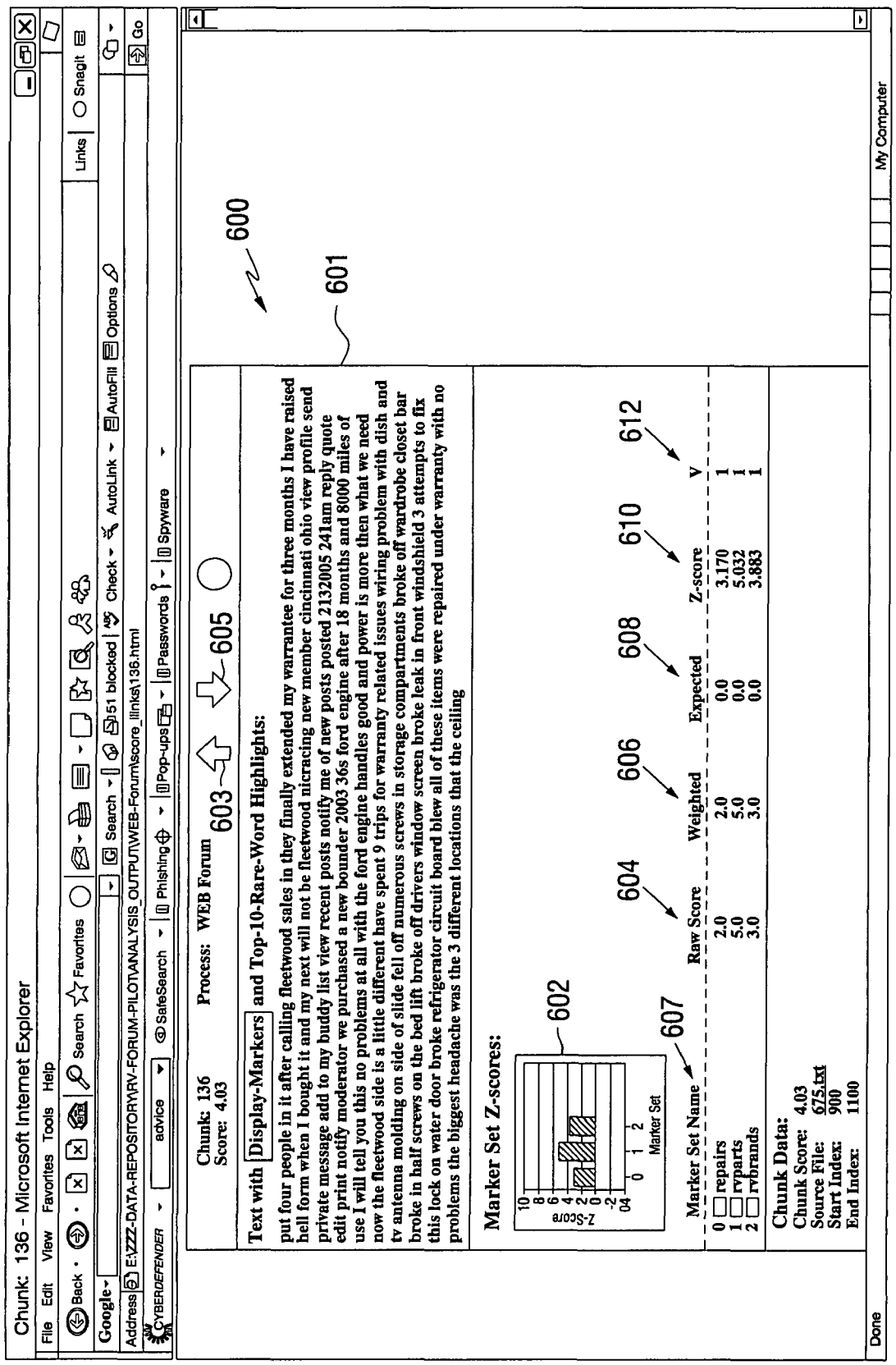

FIG. 6 shows a user interface 600 for displaying various marker set scores for a textual unit. Individual marker set scores, or combinations thereof, may be considered by one or more evaluative rules. Field 601 displays a textual unit included in the test corpus. Field 602 shows a chart of the z-scores corresponding to the textual unit shown at field 601 for each of the applied marker sets. Below the field 602, column 607 lists the applied marker sets. The raw score for each marker set, relative to the textual unit is listed in column

604, and the weighted score is listed in column 606. The expected score and z-scores are listed in columns 608 and 610 respectively. A validity of the scores relative to each marker set is listed at field 612. The validity may indicate whether the scores for the marker set are high enough to be statistically significant. In various embodiments, a user may cycle the interface 600 through different textual units using arrow keys 603, 605.

A particular evaluative rule set describing content of interest may be generated according to any suitable method. For example, a seed evaluative rule set may be generated based on intuition, experience, statistical analysis of the test corpus or a reference corpus, etc. The seed evaluative rule set may comprise a marker, marker set or plurality of marker sets, which may be applied to a corpus and refined based on the results. This process may be repeated as desired to further refine the evaluative rule set.

According to various embodiments, the context of the seed evaluative rule set may be analyzed. One or more test marker sets indicating various text types may be applied to the corpus. Instances of a test marker set that occur within a predetermined range of an instance of the seed evaluative rule may be displayed. For example, a group of tokens including the instance of the seed evaluative rule set, the instances of the marker set, and one or more intervening tokens may be displayed. This may provide an indication of which marker sets typically occur close to those of the seed evaluative rule set, as well as what type of content is present when they do. The seed evaluative rule set may be modified based on the results. For example, when a marker set tends to indicate content of interest when it occurs near those of the seed evaluative rule set, it may be added to the seed evaluative rule set.

Various criteria may be used to determine whether two marker/evaluative rule instances occur within a predetermined range. For example, the predetermined range may be a predetermined number of tokens. If two instances occur within a predetermined number of tokens from one another, the instances may be considered within the predetermined range. Also, the predetermined range may be determined based on textual units. For example, if two instances occur within the same textual unit, they may be considered within the predetermined range.

Also, in various embodiments, predetermined evaluative rules or rule sub-sets may be developed and verified, providing a tool box of potential evaluative rules that return known results. For example, an evaluative rule sub-set may identify content discussing an insolvency analysis. Accordingly, if, for example, the content of interest is a particular insolvency analysis performed by Corporation A in late 2003, the evaluative rule sub-set identifying insolvency analysis may be combined with other evaluative rules to form an evaluative rule set.

It will be appreciated that evaluative rule sets may be generated, revised and/or optimized based on user feedback. For example, FIG. 7 shows a user interface 700 for developing and/or revising an evaluative rule set based on given content. Field 702 may list a textual unit. Field 703 may list a graphical representation of various marker set-based scores for the textual unit. The interface 700 may be provided to one with knowledge regarding the content of interest, who may indicate whether the textual unit conveys content of interest, and the extent to which it does so, at box 704. Accordingly, a correlation between various actual or potential evaluative rules and content of interest may be generated.

Referring back to FIG. 5, at step 506, marker sets that are the subject of the evaluative rules may be applied to the test corpus. Raw and derivative scores necessary for applying the evaluative rules may be calculated, and the evaluative rules may be applied to each textual unit included in the test corpus. At step 508, an evaluative fit coefficient may be generated for some or all of the textual units. The fit coefficient may be a representation of how well a textual unit complies with the evaluative rule set. The fit coefficient for a textual unit may also indicate a likelihood that the textual unit includes content of interest.

In various embodiments, evaluative rule sets may be applied in a nested manner. For example, a first evaluative rule or rule set may be applied to a test corpus. Then, a second evaluative rule set may be selected from among several potential evaluative rule sets based on the results of applying the first evaluative rule or rule set.

Figure 8:
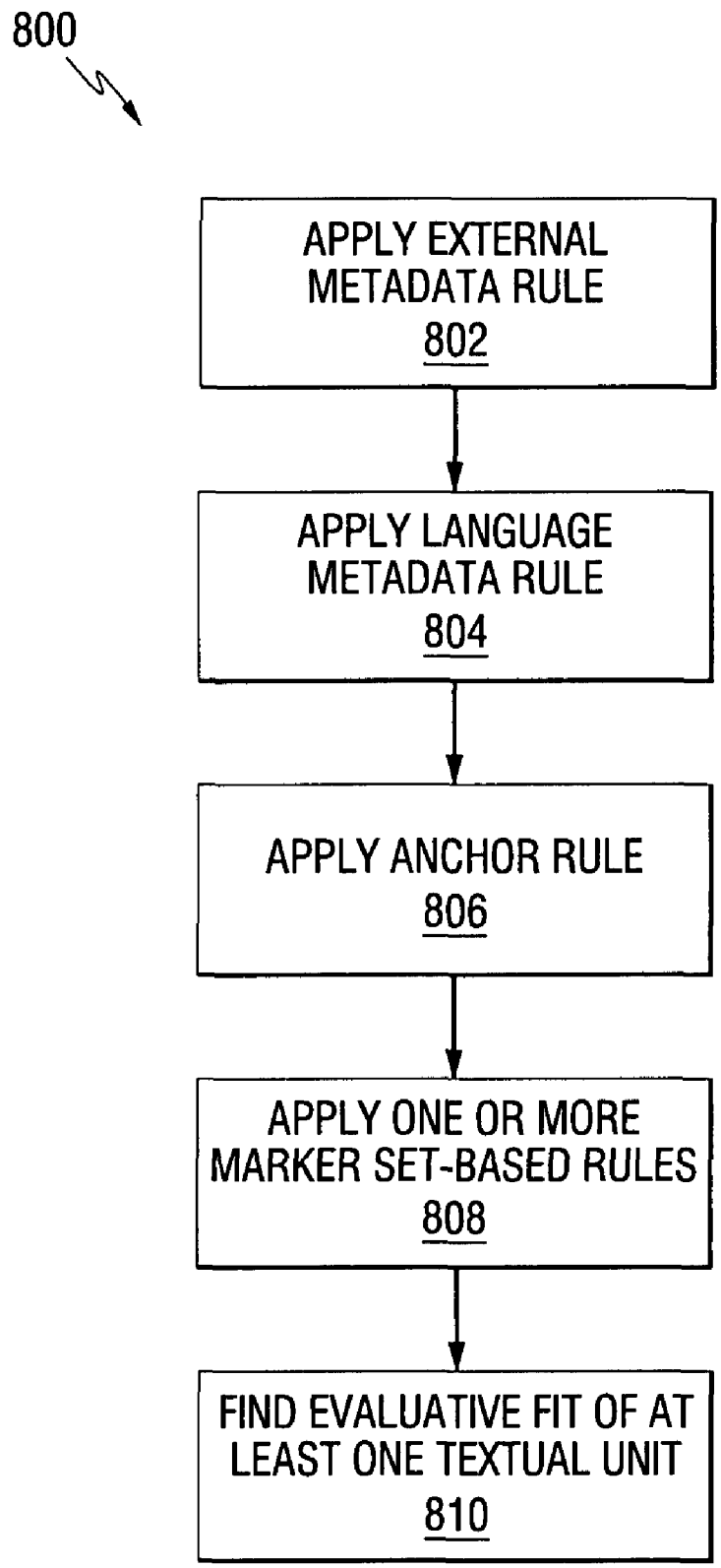
FIG. 8 shows a flow chart illustrating a process flow for identifying content of interest using one or more marker sets according to various embodiments.

FIG. 8 shows a flow chart illustrating a process flow 800, according to various embodiments, for applying an exemplary evaluative rule set to identify content of interest within a test corpus. At step 802, an evaluative rule based on external metadata of textual units included in the test corpus may be applied. Examples of external metadata include file owner, file type, file creation/modification dates, etc. In various embodiments, the rule may be a gate-type rule and may exclude some textual units from further analysis. For example, content may not be of interest unless it is included in a textual unit created by a particular individual and/or modified at or around a given date.

At step 804, an evaluative rule based on language metadata for each textual unit may be analyzed. Language metadata may include statistics about the various tokens and combinations thereof included in the textual unit. For example, language metadata may include the number of tokens in a textual unit, the number of characters per token, a rarity or average rarity of tokens in the textual unit, etc. In various embodiments, analyzing language metadata may also comprise applying one or more marker sets that indicate text conveying a particular language (e.g., English, French, Japanese, etc.). In this way, the language of given textual units may be determined. In various embodiments, additional textual units may be excluded from further consideration based on the analysis of language metadata. For example, various embodiments may exclude, textual units written in Spanish and/or textual units having fewer than three characters per token. In other embodiments, language metadata may be incorporated into the score set for a textual unit that is considered to determine whether it contains content of interest.

Figure 9:
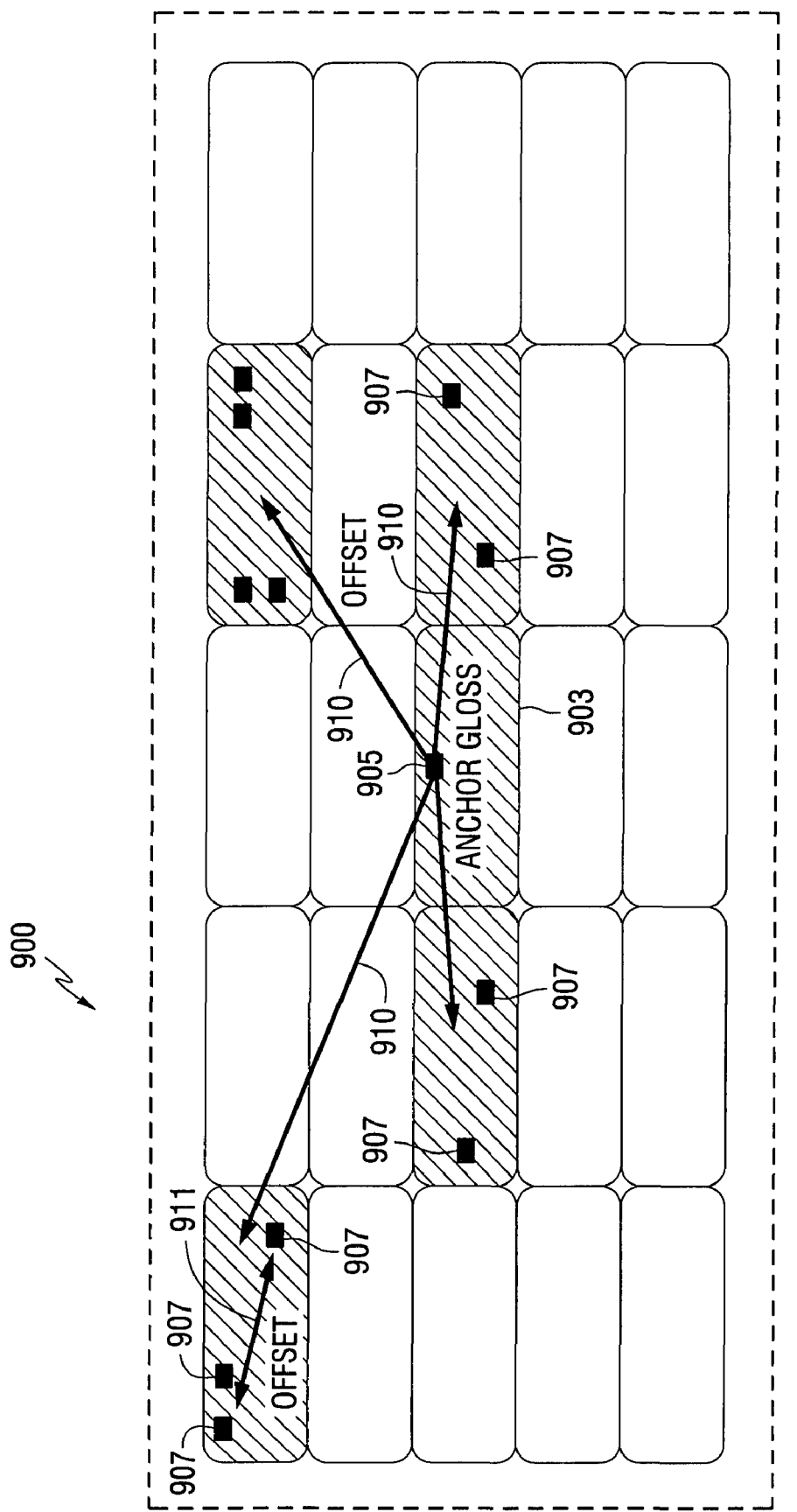
FIG. 9 shows a block diagram of a file according to various embodiments.

At step 806, an evaluative rule may be applied by finding instances of an anchor in the test corpus. The anchor may be, for example, a marker, a marker set, a plurality of marker sets. Textual units including an instance of the anchor may be subject to further analysis, and those that do not may be excluded. At step 808, a plurality of marker sets identifying text of particular types may be applied to the textual units still under consideration (e.g., textual units including an instance of the anchor). For example, FIG. 9 shows a diagram of a group textual units 900. An anchor textual unit 903 includes an instance 905 of the anchor. Offsets between the anchor textual units 903 and other textual units including other marker set instances 907 are represented by arrows 910. Offsets between marker set instances are represented by arrow 911. It will be appreciated that these offsets 910, 911, as well as statistical values based on instances of the marker set or sets, may be considered by one or more evaluative rules.

Referring back to FIG. 8, at step 810, an evaluative fit may be found for each textual unit that is still under consideration after evaluative rules are applied at steps 802, 804, 806 and 808. The evaluative fit may describe the degree to which a textual unit complies with the evaluative rules, and may be an indication of the likelihood that the textual unit includes content of interest.

Figure 12A:
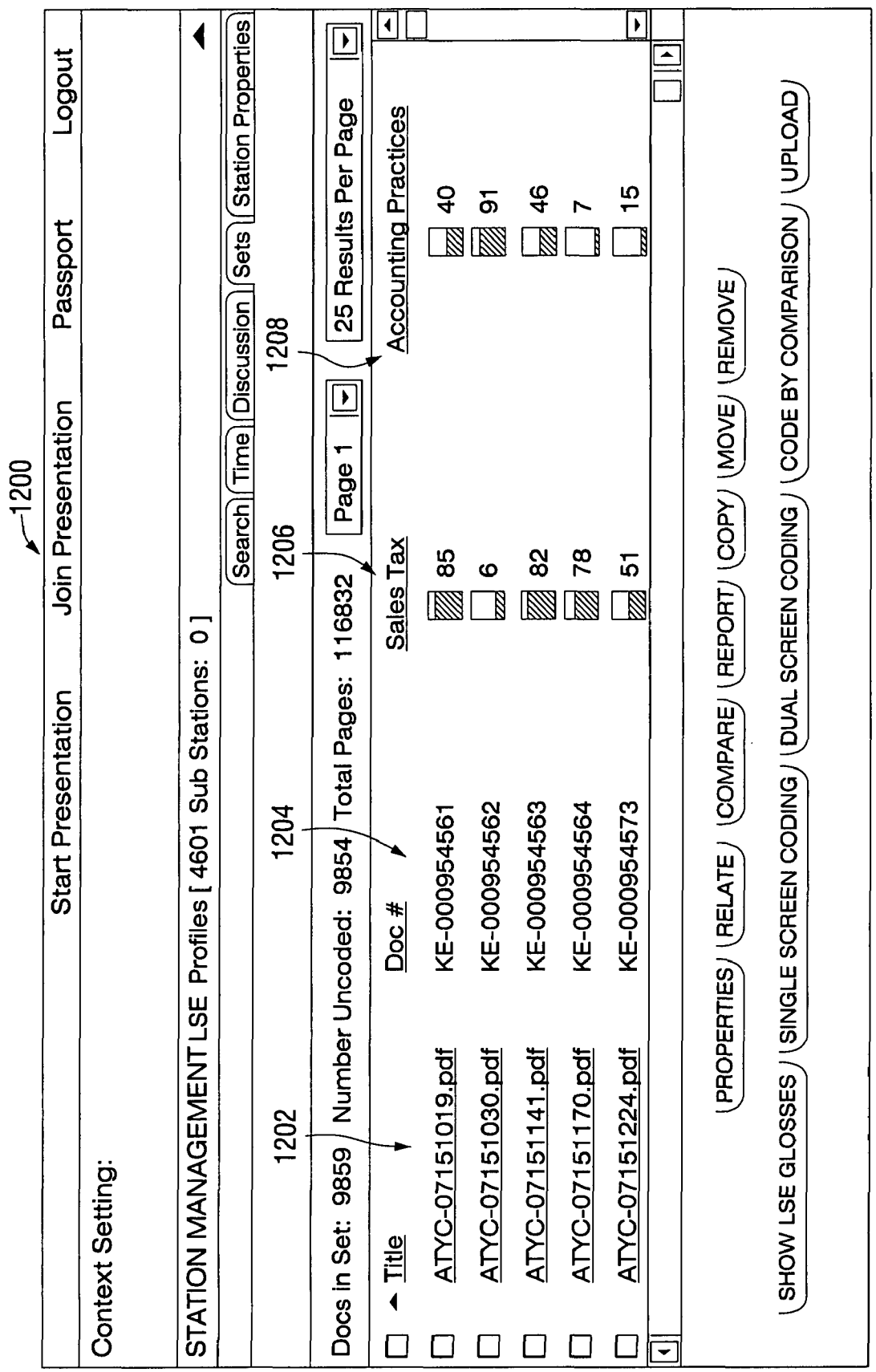

Results of the application of one or more evaluative rule sets may be presented to a user in any suitable way. For example, FIG. 12A shows a user interface 1200, according to various embodiments, for presenting results to a user in a top-down or document-by-document manner. A list of textual units that were included in the test corpus is shown at column 1202. The textual units shown may be those that were not eliminated from consideration by one or more of the evaluative rule sets. Column 1204 shows an optional identification number for the textual units. Columns 1206 and 1208 may show an evaluative fit for each of the textual units relative to two sets of evaluative rules. For example, column 1206 shows an evaluative fit between each textual unit and an evaluative rule set that identifies content relating to "Sales Tax." The evaluative fit may be shown in both numerical and graphical form. Column 1208 shows an evaluative fit between each textual unit and an evaluative rule set that identifies content relating to "Accounting Practices."

Figure 12B:
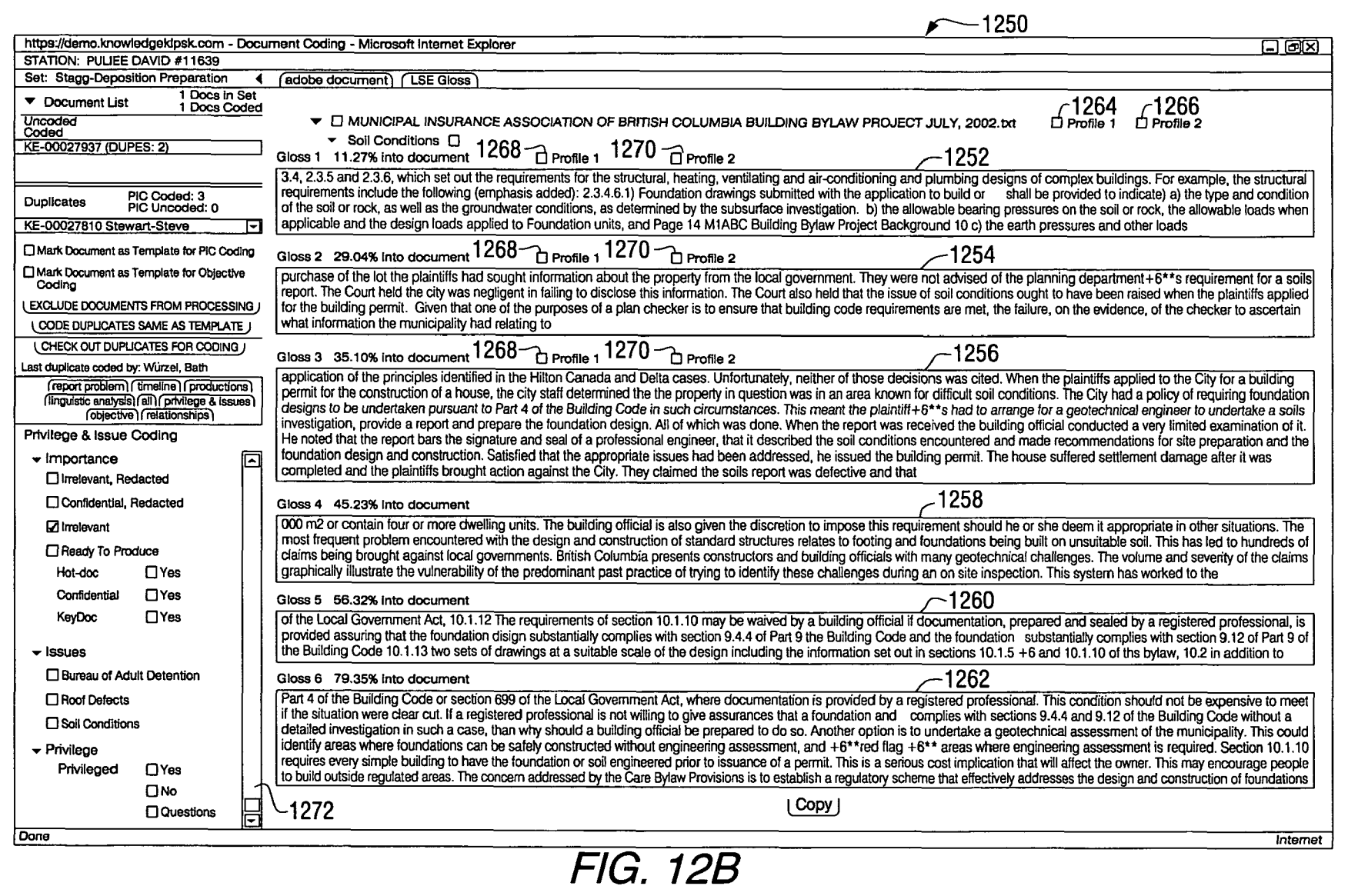

Selecting one of the textual unit, either by file name or number (e.g., column 1202 or column 1204) may allow a user to view more detailed information, for example, regarding the textual units or portions thereof. For example, FIG. 12B shows a user interface 1250 that displays various textual units 1252, 1254, 1256, 1258, 1260, 1262. Instances of a marker, marker set, evaluative rule criterion, etc., that are present in the various textual units may be highlighted. In various embodiments, boxes 1264 and 1266 may provide an indication of an evaluative fit between the textual unit and the various evaluative rule sets (e.g., profiles). The evaluative fit may be indicated by the boxes' 1264 1266 color, degree shading, etc. Similar boxes 1268, 1270 may be provided for some or all of the textual units 1252, 1254, 1256, 1258, 1260, 1262. The interface 1250 may also include field 1272 where a user may enter feedback regarding the fit of the textual unit to various evaluative rule sets (e.g., whether the file includes content of interest, and what content of interest it contains). For example, FIG. 12B shows an implementation in the context of a litigation support tool. In this example, the user may enter various information about the textual unit including whether it is relevant, irrelevant, confidential, etc. The user may also note whether the textual unit includes content relating to various topics (e.g., Bureau of Adult Detention; Roof Defects; Soil Conditions, etc.).

It will be appreciated that results of the application of one or more evaluative rule sets may also, or alternatively, be presented in a horizontal, or content based manner. For example, the user may be presented with textual units based on their evaluative fit to the one or more evaluative rule sets. The user may then navigate through the textual units based on their level of evaluative fit. For example, from a first textual unit with a first level of evaluative fit, the user may be able to navigate down the line to textual units having a higher level of evaluative fit, or up the line to textual units having a lower level of evaluative fit. According to various embodiments, the user may be shown, or have the ability to view, text around the textual units including content of interest. In this way, the user may view content of interest, as well as the context in which it appears.

Various embodiments are described above with reference to a textual unit, which may be any suitable sub-division of a corpus that includes one or more tokens. For example, according to various embodiments, a textual unit may correspond to a file, document, web page, etc. Also, according to various embodiments, a textual unit may be configured to include less than an entire file, document, web page, etc. For example, textual units may include files, pages of files, subdivisions of files, etc. Also, according to various embodiments, adjacent textual units may be configured to overlap by several tokens.

In various embodiments it may be desirable to generate statistical values describing a corpus, and/or the use of a marker or token within the corpus. The various statistical values may be useful for generating and/or applying marker sets as described above, performing corpus level comparisons between two or more corpora, characterizing information on a corpus level, generating and/or applying evaluative rule sets, etc. Examples of statistical values that may be generated include, for example, frequency, z-score, rarity and saliency. The corpus that is the subject of a statistical value may be referred to as a subject corpus. It will be appreciated that a subject corpus may be any corpus including, for example, a test corpus or a reference corpus described above.

Frequency is a statistical value that may be generated with respect to one marker marker set, etc., and may describe the number of occurrences of the marker, marker set, etc., in a subject corpus. It will be appreciated that frequency may be calculated with respect to the subject corpus, and with respect to textual units in the subject corpus. For example, a frequency of the marker may be found in the subject corpus as a whole. A frequency of textual units in the corpus including the marker may also be found. It will be appreciated that various other permutations of frequency may be found and used in subsequent calculations. In various embodiments, frequencies may be scaled and/or normalized to facilitate comparison of statistical values between corpora. For example, the frequency of the marker per corpus may be found assuming a corpus having a standard number of tokens (e.g., 1,000,000). The raw frequency value may then be scaled to a frequency per 1,000,000 tokens. In the same way, textual unit-based frequencies may be scaled based on a textual unit normal number of tokens (e.g. 1000). It will be appreciated that the standard number of tokens for a corpus and for a textual unit may vary.

Z-score is a statistical value that may be generated with respect to one marker marker set, etc. and may describe the frequency of the marker, marker set, etc., in a subject us relative to a frequency of the marker in one or more reference corpora. The one or more reference corpora may include any suitable corpus including, for example, the seed and/or reference corpora described above. Like frequency, z-scores may be calculated on a corpus level (e.g., a comparison of marker instances per corpus) and on a textual unit level (e.g., a comparison of files per corpus including a marker instance), as well as in various other permutations. The z-score may be expressed by Equation 1 below:

$$z_i = \frac{x_i - \bar{x}}{\sigma} \quad (1)$$

where $x_i$ is the frequency of the marker in the subject corpus, $\bar{x}$ is the mean frequency of the marker base on the reference corpus or corpora, and $\sigma$ the standard deviation.

Rarity is a statistical value that may be generated with respect to one marker, marker set, etc., and may describe the relative infrequency of instances of the marker, marker set, etc., in a subject corpus. Rarity may be measured in any suitable manner. In various embodiments, however, rarity of a marker may be computed by comparison to the similar type marker (e.g., token, bi-gram, etc.) that most frequently occurs in the subject corpus. For example, the raw count of the marker within the corpus may be divided by the raw count of the most common marker of similar type. The result may then be inverted. In this way, markers will have a rarity score of between zero and one, with the scores of seed markers with the highest rarity approaching one. In various embodiments, the distribution of rarity values may be manipulated further by raising the rarity values to tenth or other suitable power. In this way the distribution of rarity values may be increased, similarly increasing their meaning. Like frequency and z-score, rarity may also be calculated on a corpus and a textual unit basis, as well as in other various permutations.

Saliency is a statistical value that may be generated with respect to one marker or marker set, and may describe the significance of an occurrence of the marker or marker set based its frequency and the frequency of other similar markers in the subject corpus. In various embodiments, the saliency of a marker may be found by multiplying the average of the marker's corpus and textual unit based z-scores and rarities according to Equation 2:

$$\text{Saliency} = \frac{freqz + filez}{2} * \frac{freqr + filer}{2} \qquad (2)$$

where freqz is the z-score of the marker by frequency in the corpus; filez is the z-score of the marker by the number of textual units including instances of the marker; freqr is the rarity of the seed marker by frequency in the corpus; and filer is the rarity of the marker by number of textual units including instances of the marker.

It will be appreciated that various other statistical values may be generated that describe a subject corpus and/or textual units within the subject corpus. Examples include a total number of tokens in the corpus, an average textual unit size in the corpus, a distribution of all or a portion of the tokens in the subject corpus by frequency, etc. FIGS. 10A and 10B show a user interface 1000 for presenting various other statistical values describing a subject corpus. Column 1002 lists various statistical values and column 1004 lists corresponding values.

It will also be appreciated that for large subject corpora, it may be impractical to compute some or all of the statistical values discussed above due to limitations relating to processing speed, memory requirements, etc. Accordingly, some or all of the statistical values discussed above may be generated based on a stratified sample of a subject corpus. The sample may be a selection of textual units chosen from the subject corpus such that all of the textual units in any given subset of the subject corpus have an equal chance of selected for the sample, and such that no subset of the subject corpus is disproportionately represented in the sample. In this way, the statistical properties of the sample may mirror those of the subject corpus as a whole. Sampling the subject corpus may not be necessary for all types of statistical analyses, or in all cases. For example, if the desired statistical analysis is not processor and/or memory intensive, and/or if the corpus is relatively small, then sampling may not be required. It will also be appreciated that as processing and memory technology improves, the need for sampling will lessen.

Figure 11:
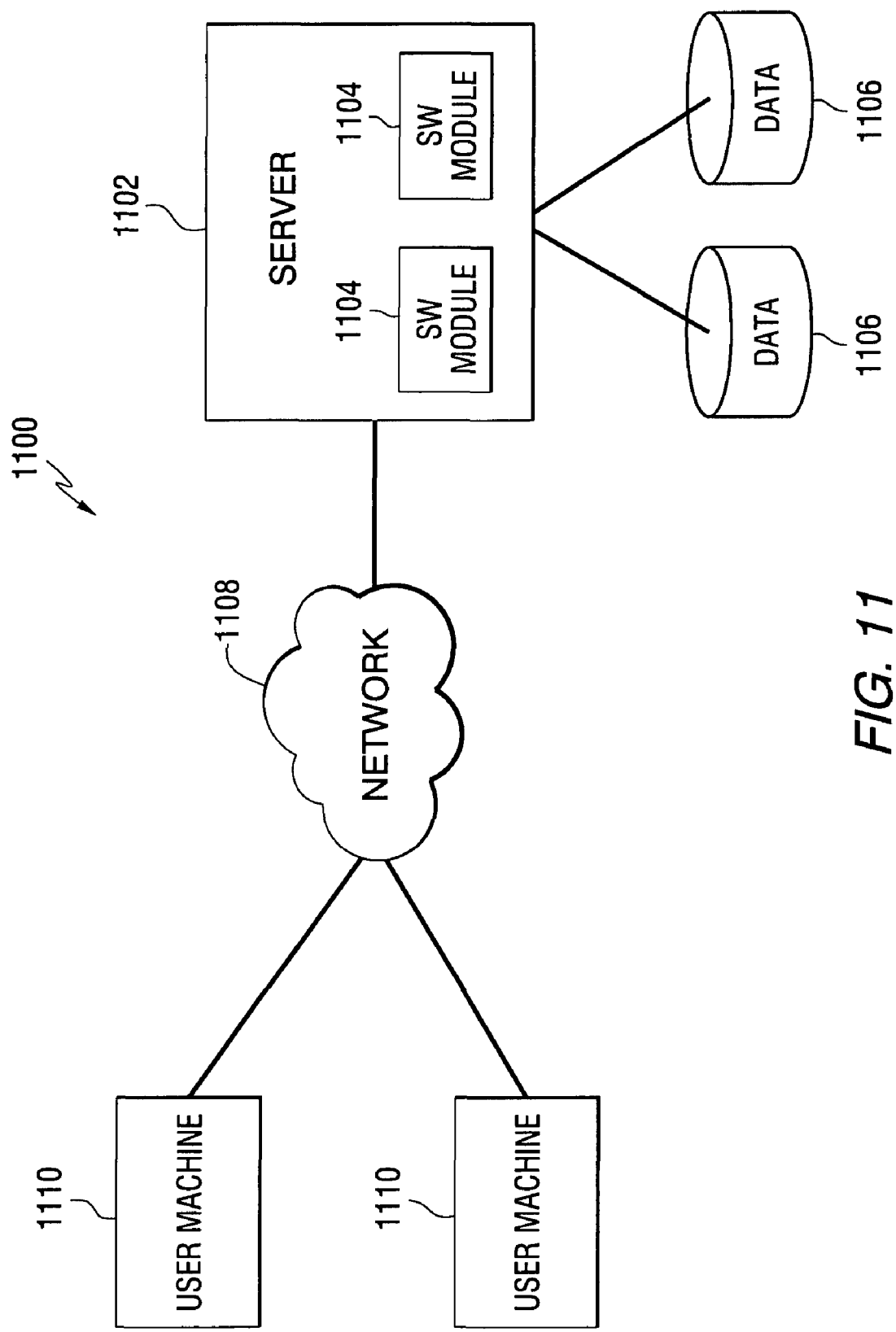
FIG. 11 shows a diagram of a computer system according to various embodiments.

FIG. 11 shows a computer system 1100 according to various embodiments. The computer system 1100 may be used to perform various tasks related to identifying content of interest including, for example, performing statistical analysis of corpora, generating marker sets, evaluating marker sets, generating evaluative rule sets, evaluating evaluative rule sets, applying markers, marker sets and/or evaluative rule sets, etc.

The computer system 1100 may include a server 1102, user machines 1110 and databases 1106. The various components 1102, 1110, 1106 may communicate with one another by utilizing a wired or wireless network 1108 that may be, for example, a local area network (LAN) or wide area network (WAN).

The server 1102 may execute one or more software modules 1104. Each of the software modules 1104 may perform a calculation or task related to identifying content of interest. For example, one module 1104 may perform statistical analysis of corpora. Another of the modules 1104 may generate and/or apply marker sets, evaluative rule sets, etc. Data necessary to perform these tasks, such as, for example, previously generated marker sets, evaluative rule sets, evaluative rules, rule sub-sets, etc. may be included in one or more of databases 1106.

A user may access the results of calculations performed at the server 1102 from a user machine 1110 via network 1108. For example, the user machine 1110 may provide one or more of the above-described user interfaces to the user. It will be appreciated that the user interfaces may be provided in any acceptable format including, for example, an e-mail message, a web page, a dedicated application, etc. It will be appreciated that, in various embodiments, the user machines 1110 may also have some or all of the functionality of the server 1102 and modules 1104, as well as access to databases 1106. In this way, the user machines 1110 may operate independent of the server 1102.

As used herein, the term "corpus" refers a body or collection of information.

As used herein, the term "token" refers to a unit of a corpus that comprises a word or other string of characters.

As used herein, the term "marker" refers to a token or combination of tokens. Example markers include tokens, n-grams and collocates.

As used herein, the term "n-gram" refers to a series of tokens occurring consecutively (e.g., "before scheduled departure"). Different types of n-grams may have different numbers of tokens. For example, a 2-gram may include two tokens, a 3-gram may include three tokens, and so on.

As used herein, the term "collocate" refers to a series of tokens that need not occur continuously (e.g., "departure" within 3 tokens of time).

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, etc. Those of ordinary skill in the art will recognize that these and other elements may be desirable. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Various modules 1104 of the system 1100 may be implemented as software code to be executed by a processor(s) of any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A computer-implemented method of identifying content of interest within a corpus, the method comprising:
   identifying with a computer a textual unit in the corpus that includes an instance of an anchor marker set, wherein the computer comprises a processor circuit and operatively associated memory;
   generating with the computer a plurality of scores for the textual unit, wherein each of the plurality of scores indicates a number of instances in the textual unit of one of a plurality of marker sets;
   comparing with the computer the plurality of scores to a plurality of reference scores;
   calculating with the computer an offset between the instance of the anchor marker set and an instance of one of the plurality of marker sets;
   determining with the computer whether the textual unit comprises content of interest considering the comparing and the offset; and
   generating a marker set selected from the group consisting of the anchor marker set and a first marker set selected from the plurality of marker sets, wherein generating the marker set comprises:
   selecting a seed marker set comprising at least one seed marker;
   generating a seed corpus from a first reference corpus, wherein the seed corpus comprises a plurality of textual units, and wherein each of the plurality of textual units included in the seed corpus comprises at least one instance of a seed marker included in the seed marker set;
   generating a statistical value describing the seed marker set and the seed corpus; and
   generating a revised seed marker set.

2. The method of claim 1, further comprising identifying at least one textual unit in the corpus that has external metadata consistent with a first set of criteria.

3. The method of claim 2, wherein the first set of criteria includes at least one criterion selected from the group consisting of: an owner, a type, a creation date and a modification date.

4. The method of claim 1, further comprising identifying at least one textual unit in the corpus that has language metadata consistent with a second set of criteria.

5. The method of claim 1, wherein the second set of criteria includes at least criterion selected from the group consisting of: a total number of tokens, an average number of characters per token, a number of tokens in a particular category.

6. The method of claim 1, further comprising generating a second plurality of scores for the textual unit, wherein each of the second plurality of scores indicates a number of instances in the textual unit of one of a second plurality of marker sets.

7. The method of claim 6, wherein at least one of the second plurality of marker sets includes markers that indicate a first language.

8. The method of claim 1, wherein generating the marker set further comprises analyzing a plurality of instances of markers included in the seed marker set in context.

9. The method of claim 1, wherein generating the marker set further comprises:
   generating a revised seed corpus from the seed corpus, wherein the revised seed corpus comprises a second plurality of textual units, and wherein each of the second plurality of textual units included in the revised seed corpus comprises at least one instance of a second seed marker included in the revised seed marker set; and
   generating a second statistical value describing the revised seed marker set and the revised seed corpus.

10. The method of claim 1, wherein the statistical value indicates at least one of a rarity of a seed marker in the seed corpus and a saliency of the seed marker in the seed corpus.

11. The method of claim 1, wherein generating the statistical value comprises:
    generating a first frequency of instances of a seed marker in the seed corpus; and
    comparing the first frequency to an expected first frequency of instances of the seed marker in the seed corpus.

12. The method of claim 1, wherein each of the plurality of reference scores represents an average score for one of the plurality of marker sets in a reference corpus.

13. The method of claim 1, wherein the anchor marker set comprises a single marker, the method further comprising:
    for an instance of one of the plurality of marker sets that occurs within a predetermined range of an instance of the anchor marker set, displaying tokens comprising the instance of the one of the plurality of marker sets, the tokens comprising the anchor marker set and an intervening token.

14. The method of claim 13, wherein the instance of the one of the plurality of marker sets occurs within the predetermined range of the instance of the anchor marker set upon at least one condition selected from the group consisting of: the instance of the one of the plurality of marker sets and the instance of the anchor marker set occurring within a predetermined number of tokens; and the instance of the one of the plurality of marker sets and the instance of the anchor marker set occurring within a common textual unit.

15. A computer-implemented method of identifying content of interest within a corpus, the method comprising:
    identifying with a computer a textual unit in the corpus that includes an instance of an anchor marker set, wherein the computer comprises a processor circuit and operatively associated memory;

generating with the computer a plurality of scores for the textual unit, wherein each of the plurality of scores indicates a number of instances in the textual unit of one of a plurality of marker sets;

comparing with the computer the plurality of scores to a plurality of reference scores;

calculating with the computer an offset between the instance of the anchor marker set and an instance of one of the plurality of marker sets;

determining with the computer whether the textual unit comprises content of interest considering the comparing and the offset;

for an instance of one of the plurality of marker sets that occurs within a predetermined range of an instance of the anchor marker set, displaying tokens comprising the instance of the one of the plurality of marker sets, the tokens comprising the anchor marker set and an intervening token, wherein the instance of the one of the plurality of marker sets occurs within the predetermined range of the instance of the anchor marker set upon at least one condition selected from the group consisting of: the instance of the one of the plurality of marker sets and the instance of the anchor marker set occurring within a predetermined number of tokens; and the instance of the one of the plurality of marker sets and the instance of the anchor marker set occurring within a common textual unit.

16. A system for identifying content of interest within a corpus, the system comprising a processor circuit and an operatively associated memory, wherein the processor circuit is programmed to:

identify a textual unit in the corpus that includes an instance of an anchor marker set, wherein the anchor marker set comprises a single marker;

generate a plurality of scores for the textual unit, wherein each of the plurality of scores indicates a number of instances in the textual unit of one of a plurality of marker sets;

compare the plurality of scores to a plurality of reference scores;

calculate an offset between the instance of the anchor marker set and an instance of one of the plurality of marker sets;

determine whether the textual unit comprises content of interest considering the comparing and the offset; and generate a marker set selected from the group consisting of the anchor marker set and a first marker set selected from the plurality of marker sets, wherein generating the marker set comprises:

selecting a seed marker set comprising at least one seed marker;

generating a seed corpus from a first reference corpus, wherein the seed corpus comprises a plurality of textual units, and wherein each of the plurality of textual units included in the seed corpus comprises at least one instance of a seed marker included in the seed marker set;

generating a statistical value describing the seed marker set and the seed corpus; and generating a revised seed marker set.

17. The system of claim 16, wherein the processor circuit is further programmed to identify at least one textual unit in the corpus that has external metadata consistent with a first set of criteria.

18. the system of claim 17, wherein the first set of criteria includes at least one criterion selected from the group consisting of: an owner, a type, a creation date and a modification date.

19. The system of claim 16, wherein the processor circuit is further programmed to identify at least one textual unit in the corpus that has language metadata consistent with the second set of criteria.

20. The system of claim 19, wherein the second set of criteria includes at least criterion selected from the group consisting of: a total number of tokens, an average number of characters per token, a number of tokens in a particular category.

21. The system of claim 16, wherein the processor circuit is further programmed to generate a second plurality of scores for the textual unit, wherein each of the second plurality of scores indicates a number of instances in the textual unit of one of a second plurality of marker sets.

22. The system of claim 21, wherein the at least one of the second plurality of marker sets includes markers that indicate a first language.

23. The system of claim 16, wherein the generating marker set further comprises analyzing a plurality of instances of markers included in the seed marker set in context.

24. The system of claim 16, wherein the generating the marker set further comprises:

generating a revised seed corpus from the seed corpus, wherein the revised seed corpus comprises a second plurality of textual units, and wherein each of the second plurality of textual units included in the revised seed corpus comprises at least one instance of a second seed marker included in the revised seed marker set; and generating a second statistical value describing the revised seed marker set and the revised seed corpus.

25. The system of claim 16, wherein the statistical value indicates at least one of a rarity of a seed marker in the seed corpus and a saliency of the seed marker in the seed corpus.

26. The system of claim 16, wherein the generating the statistical value comprises:

generating a first frequency of instances of a seed marker in the seed corpus; and comparing the first frequency to an unexpected first frequency of instances of the seed marker in the seed corpus.

27. The system of claim 16, wherein each of the plurality of reference scores represents an average score for one of the plurality of marker sets in a reference corpus.

28. The system of claim 16, wherein the anchor marker set comprises a single marker, the method further comprising:

for an instance of one of the plurality of marker sets that occurs within a predetermined range of an instance of the anchor marker set, displaying tokens comprising the instance of the one of the plurality of marker sets, the tokens comprising the anchor marker set and an intervening token.

29. The system of claim289, wherein the instance of the one of the plurality of marker sets within the predetermined range of the instance of the anchor marker set upon at least one condition selected from the group consisting of: the instance of the one of the plurality of marker sets and the instance of the anchor marker set occurring within a predetermined number of tokens; and the instance of the one of the plurality of marker sets and the instance of the anchor marker set occurring within a common textual unit.

30. A system for identifying content of interest within a corpus, the system comprising a processor circuit and an operatively associated memory, wherein the processor circuit is programmed to:
- identify a textual unit in the corpus that includes an instance of an anchor marker set, wherein the anchor marker set comprises a single marker;
- generate a plurality of scores for the textual unit, wherein each of the plurality of scores indicates a number of instances in the textual unit of one of a plurality of marker sets;
- compare the plurality of scores to a plurality of reference scores;
- calculate an offset between the instance of the anchor marker set and an instance of one of the plurality of marker sets;
- determine whether the textual unit comprises content of interest considering the comparing and the offset; and
- for an instance of one of the plurality of marker sets that occurs within a predetermined range of an instance of the anchor marker set, displaying tokens comprising the instance of the one of the plurality of marker sets, the tokens comprising the anchor marker set and an intervening token, wherein the instance of the one of the plurality of marker sets occurs within the predetermined range of the instance of the anchor marker set upon at least one condition selected from the group consisting of: the instance of the one of the plurality of marker sets and the instance of the anchor marker set occurring within a predetermined number of tokens; and the instance of the one of the plurality of marker sets and the instance of the anchor marker set occurring within a common textual unit.

31. A computer readable medium comprising instructions that when executed by a processor, cause the processor to perform the steps of:
- identifying a textual unit in the corpus that includes an instance of an anchor marker set;
- generating a plurality of scores for the textual unit, wherein each of the plurality of scores indicates a number of instances in the textual unit of one of a plurality of marker sets;
- comparing the plurality of scores to a plurality of reference scores;
- calculating an offset between the instance of the anchor marker set and an instance of one of the plurality of marker sets;
- determining whether the textual unit comprises content of interest considering the comparing and the offset; and
- generating a marker set selected from the group consisting of the anchor marker set and a first marker set selected from the plurality of marker sets, wherein generating the marker set comprises:
  - selecting a seed marker set comprising at least one seed marker;
  - generating a seed corpus from a first reference corpus, wherein the seed corpus comprises a plurality of textual units, and wherein each of the plurality of textual units included in the seed corpus comprises at least one instance of a seed marker included in the seed marker set;
  - generating a statistical value describing the seed marker set and the seed corpus; and
  - generating a revised seed marker set.

32. A computer readable medium comprising instructions that when executed by a processor, cause the processor to perform the steps of:
- identifying a textual unit in the corpus that includes an instance of an anchor marker set, wherein the anchor marker set comprises a single marker;
- generating a plurality of scores for the textual unit, wherein each of the plurality of scores indicates a number of instances in the textual unit of one of a plurality of marker sets;
- comparing the plurality of scores to a plurality of reference scores;
- calculating an offset between the instance of the anchor marker set and an instance of one of the plurality of marker sets;
- determining whether the textual unit comprises content of interest considering the comparing and the offset; and
- for an instance of one of the plurality of marker sets that occurs within a predetermined range of an instance of the anchor marker set, displaying tokens comprising the instance of the one of the plurality of marker sets, the tokens comprising the anchor marker set and an intervening token, wherein the instance of the one of the plurality of marker sets occurs within the predetermined range of the instance of the anchor marker set upon at least one condition selected from the group consisting of: the instance of the one of the plurality of marker sets and the instance of the anchor marker set occurring within a predetermined number of tokens; and the instance of the one of the plurality of marker sets and the instance of the anchor marker set occurring within a common textual unit.

* * * * *